US012633107B2

(12) United States Patent　　(10) Patent No.:　US 12,633,107 B2
　　Ichinose　　　　　　　　　　(45) Date of Patent:　　May 19, 2026

(54) INFORMATION PROCESSING APPARATUS, METHOD, AND PROGRAM

(71) Applicant: FUJIFILM Corporation, Tokyo (JP)

(72) Inventor: Akimichi Ichinose, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 252 days.

(21) Appl. No.: 18/584,967

(22) Filed: Feb. 22, 2024

(65)　　　　　　Prior Publication Data

US 2024/0193932 A1　　Jun. 13, 2024

Related U.S. Application Data

(63) Continuation of application No. PCT/JP2022/017868, filed on Apr. 14, 2022.

(30)　　　Foreign Application Priority Data

Sep. 2, 2021　　(JP) ................................. 2021-143234

(51) Int. Cl.
　　*G06V 10/70*　　　　(2022.01)
　　*G06V 10/82*　　　　(2022.01)
(52) U.S. Cl.
　　CPC ............ *G06V 10/82* (2022.01); *G06V 10/768* (2022.01); *G06V 2201/03* (2022.01)
(58) Field of Classification Search
　　CPC .. G06V 10/82; G06V 10/768; G06V 2201/03; A61B 6/03; G06N 20/00; G06T 7/00
　　USPC ........................................................ 382/100
　　See application file for complete search history.

(56)　　　　　　　References Cited

U.S. PATENT DOCUMENTS 9,449,256　B1 *　9/2016　Krishnaswamy ......... G06T 5/60
2009/0228299　A1　　9/2009　Kangarloo et al.
2013/0212056　A1 *　8/2013　Kawagishi ............. G16H 30/40
　　　　　　　　　　　　　　　　　　　　　706/46
2015/0131777　A1 *　5/2015　Makifuchi ........... A61B 6/5217
　　　　　　　　　　　　　　　　　　　　　378/36

(Continued)

FOREIGN PATENT DOCUMENTS

CN　　　　112308115　　　2/2021
JP　　　　2009048294　　　3/2009

(Continued)

OTHER PUBLICATIONS

"International Search Report (Form PCT/ISA/210) of PCT/JP2022/017868", mailed on Jun. 7, 2022, with English translation thereof, pp. 1-7.

(Continued)

*Primary Examiner* — Ali Bayat
(74) *Attorney, Agent, or Firm* — JCIPRNET

(57)　　　　　　　ABSTRACT

A processor uses a trained neural network to derive a property score for each of a plurality of predetermined property items regarding a structure of interest included in an image; corrects a property score for at least one property item among the plurality of property items by referring to information indicating a relationship between the plurality of property items, the information being derived by analyzing a co-occurrence relationship between descriptions of properties included in a plurality of sentences; and derives a discrimination result for the plurality of property items regarding the structure of interest based on the corrected property score.

13 Claims, 9 Drawing Sheets

(56)  References Cited

U.S. PATENT DOCUMENTS

| | | | | |
|---|---|---|---|---|
| 2018/0240235 A1* | 8/2018 | Mazo | .................. | G06N 3/0442 |
| 2018/0341839 A1 | 11/2018 | Malak et al. | | |
| 2020/0111558 A1* | 4/2020 | Matsumoto | ........... | G06T 7/0012 |
| 2020/0303062 A1* | 9/2020 | Tao | ........................ | G06N 99/00 |
| 2021/0256295 A1* | 8/2021 | Matsumoto | ........... | G06F 18/214 |
| 2021/0319880 A1* | 10/2021 | Tomii | ..................... | G16H 50/70 |
| 2021/0383905 A1* | 12/2021 | Kikuchi | ................. | G16H 15/00 |

FOREIGN PATENT DOCUMENTS

| | | |
|---|---|---|
| JP | 2016038726 | 3/2016 |
| JP | 2017162025 | 9/2017 |

OTHER PUBLICATIONS

"Written Opinion of the International Searching Authority (Form PCT/ISA/237) of PCT/JP2022/017868", mailed on Jun. 7, 2022, with English translation thereof, pp. 1-8.
Ke Yan et al., "Holistic and Comprehensive Annotation of Clinically Significant Findings on Diverse CT Images: Learning From Radiology Reports and Label Ontology", arXiv:1904.04661v2 [cs.CV], Apr. 2019, pp. 1-14.
Kurosawa, Ayane et al., "Effectiveness of linguistic information in object recognition using co-occurrence", Proceedings of the Twenty-fourth Annual Meeting of the Association for Natural Language Processing, Mar. 2018, with English translation thereof, available at: https://www.anlp.jp/proceedings/annual_meeting/2018/pdf_dir/P7-13.pdf.
"Notice of reasons for refusal of Japan Counterpart Application", issued on Mar. 3, 2026, with English translation thereof, pp. 1-8.

* cited by examiner

SOLID: –
PART SOLID: +
GROUND-GLASS: –
SPICULA: –
AIR BRONCHOGRAM: +
SMOOTH MARGIN: –
LOBULATED: –
PLEURAL INVAGINATION: –

Figure 6:
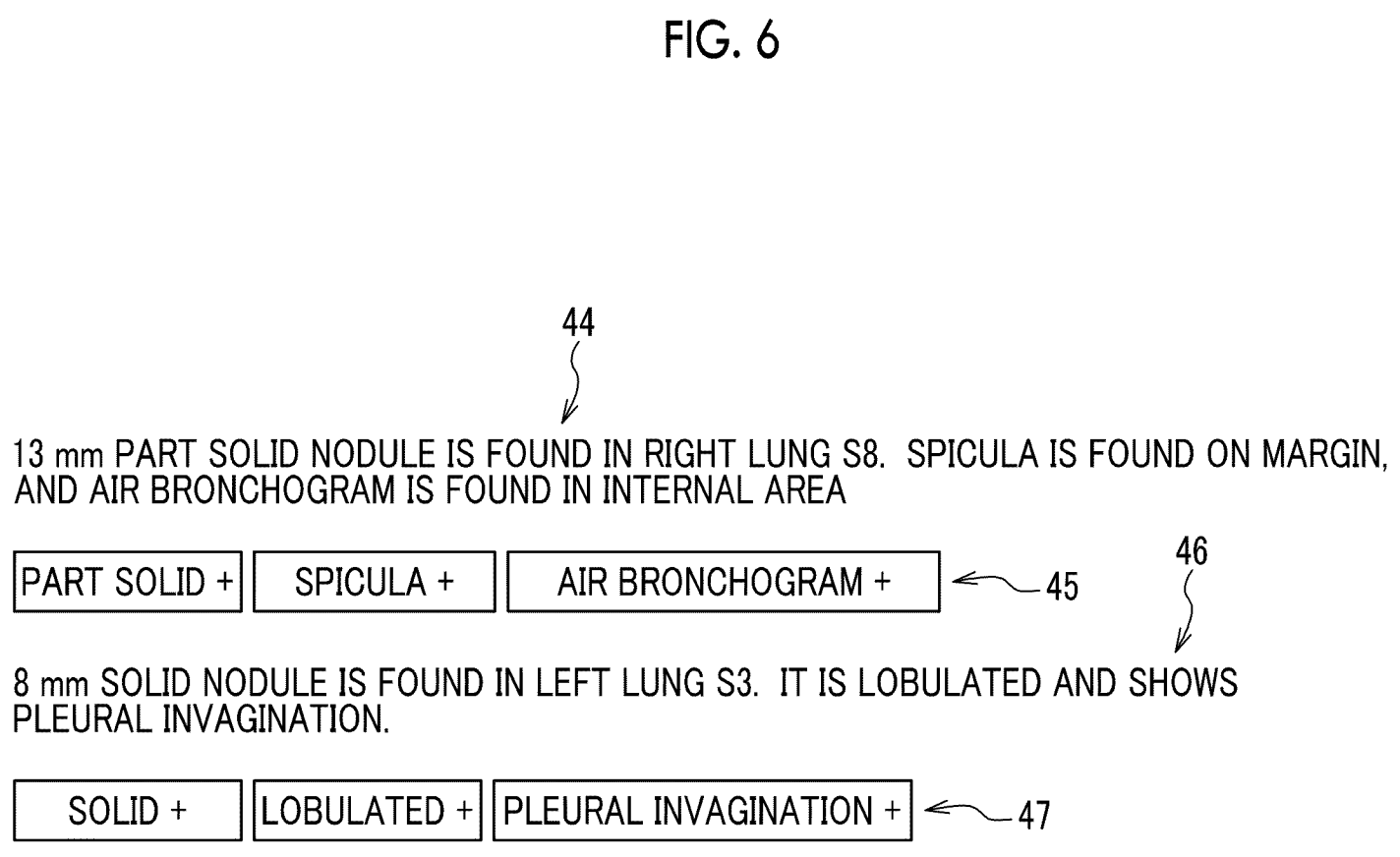

13 mm PART SOLID NODULE IS FOUND IN RIGHT LUNG S8.  SPICULA IS FOUND ON MARGIN, AND AIR BRONCHOGRAM IS FOUND IN INTERNAL AREA

| PART SOLID + | SPICULA + | AIR BRONCHOGRAM + |

45    46

8 mm SOLID NODULE IS FOUND IN LEFT LUNG S3.  IT IS LOBULATED AND SHOWS PLEURAL INVAGINATION.

| SOLID + | LOBULATED + | PLEURAL INVAGINATION + |

|  | SOLID | PART SOLID | GROUND-GLASS | SPICULA | AIR BRONCHOGRAM | SMOOTH MARGIN | LOBULATED | PLEURAL INVAGINATION |
|---|---|---|---|---|---|---|---|---|
| SOLID | 1.0 | -0.13 | -0.2 | 0.0 | 0.01 | 0.01 | 0.05 | 0.03 |
| PART SOLID | -0.13 | 1.0 | -0.13 | 0.0 | 0.20 | -0.02 | 0.0 | 0.01 |
| GROUND-GLASS | -0.2 | -0.13 | 1.0 | -0.2 | 0.10 | 0.01 | -0.2 | -0.1 |
| SPICULA | 0.0 | 0.0 | -0.2 | 1.0 | 0.0 | -0.2 | 0.2 | 0.1 |
| AIR BRONCHOGRAM | 0.01 | 0.20 | 0.10 | 0.0 | 1.0 | 0.0 | 0.01 | 0.0 |
| SMOOTH MARGIN | 0.01 | -0.02 | 0.01 | -0.2 | 0.0 | 1.0 | -0.2 | -0.12 |
| LOBULATED | 0.05 | 0.0 | -0.2 | 0.2 | 0.01 | -0.2 | 1.0 | 0.1 |
| PLEURAL INVAGINATION | 0.03 | 0.01 | -0.1 | 0.1 | 0.0 | -0.12 | 0.1 | 1.0 |

START

ST1

EXTRACT STRUCTURE OF INTEREST

ST2

DERIVE PROPERTY SCORE

ST3

CORRECT PROPERTY SCORE

ST4

OUTPUT DISCRIMINATION RESULT

ST5

DISPLAY

END

V1 (PART SOLID)

V2 (AIR BRONCHOGRAM)

V3 (GROUND-GLASS)

|  | SOLID | PART SOLID | GROUND-GLASS | SPICULA | AIR BRONCHOGRAM | SMOOTH MARGIN | LOBULATED | PLEURAL INVAGINATION |
|---|---|---|---|---|---|---|---|---|
| SOLID |  | - | -- | +/- | +/- | +/- | + | +/- |
| PART SOLID | - |  | - | +/- | ++ | +/- | +/- | +/- |
| GROUND-GLASS | -- | - |  | - | + | +/- | -- | - |
| SPICULA | +/- | +/- | - |  | +/- | -- | ++ | + |
| AIR BRONCHOGRAM | +/- | ++ | + | +/- |  | +/- | +/- | +/- |
| SMOOTH MARGIN | +/- | +/- | +/- | -- | +/- |  | -- | - |
| LOBULATED | + | +/- | -- | ++ | +/- | -- |  | + |
| PLEURAL INVAGINATION | +/- | +/- | - | + | +/- | - | + |  |

INFORMATION PROCESSING APPARATUS, METHOD, AND PROGRAM

CROSS-REFERENCE TO RELATED APPLICATIONS

This application is a continuation of International Application No. PCT/JP2022/017868, filed on Apr. 14, 2022, which claims priority from Japanese Patent Application No. 2021-143234, filed on Sep. 2, 2021. The entire disclosure of each of the above applications is incorporated herein by reference.

BACKGROUND

Technical Field

The present disclosure relates to an information processing apparatus, method, and program.

Related Art

Medical images are analyzed by computer-aided diagnosis (CAD) using a trained model constructed by training a neural network using deep learning or the like to discriminate properties such as the shape, density, position, and size of structures of interest such as lesions included in the medical images. The trained model outputs a score representing the prominence of each of a plurality of property items, and the property of the structure of interest is discriminated by comparing the output score with a threshold value.

On the other hand, in a case in which the training is not sufficient in using a trained model, discrimination results that result in impossible combinations of properties may be obtained. For example, in a case in which a lung lesion is discriminated to be positive for the property of "smooth margin", it may also be discriminated to be positive for "spicula" that include a linear structure at the periphery. For this reason, methods have been proposed to improve the accuracy of property discrimination. For example, in "Holistic and Comprehensive Annotation of Clinically Significant Findings on Diverse CT Images: Learning from Radiology Reports and Label Ontology, Ke Ya et al., 1904.04661v2 [cs.CV] 27 Apr. 2019", a method has been proposed that uses a matrix representing the relationship between properties to be discriminated. According to the method described in the literature by Ke Ya et al., by correcting the property score for each property output by the trained model using a matrix representing the relationship, it is possible to prevent discrimination results that result in impossible combinations of properties from being output.

However, in the method described in the literature by Ke Ya et al., a matrix representing the relationship between properties (hereinafter referred to as a relationship matrix) is constructed at the same time as the neural network is trained. Therefore, in order to train both the neural network and the relationship matrix so that a trained model that accurately discriminates properties can be constructed, a large amount of supervised training data that associates structures of interest and properties included in medical images is required. However, there is a limit to the number of medical images required to cover all of the plurality of properties.

SUMMARY OF THE INVENTION

The present disclosure has been made in view of the above circumstances, and an object of the present disclosure is to accurately discriminate a property of a structure of interest included in a medical image without using a large amount of supervised training data.

According to an aspect of the present disclosure, there is provided an information processing apparatus comprising at least one processor, in which the processor is configured to: use a trained neural network to derive a property score for each of a plurality of predetermined property items regarding a structure of interest included in an image; correct a property score for at least one property item among the plurality of property items by referring to information indicating a relationship between the plurality of property items, the information being derived by analyzing a co-occurrence relationship between descriptions of properties included in a plurality of sentences; and derive a discrimination result for the plurality of property items regarding the structure of interest based on the corrected property score.

In the information processing apparatus according to the aspect of the present disclosure, the processor may be configured to: further train the neural network using supervised training data in which a structure of interest included in a medical image and the plurality of property items regarding the structure of interest are specified; and update the information indicating the relationship based on a result of the training.

In addition, in the information processing apparatus according to the aspect of the present disclosure, the information indicating the relationship may be a relationship matrix in which a weight, which is larger as a co-occurrence relationship between the plurality of property items is stronger, is defined as an element.

In addition, in the information processing apparatus according to the aspect of the present disclosure, the weight may be scaled within a predetermined range.

In addition, in the information processing apparatus according to the aspect of the present disclosure, the processor may be configured to: present the relationship matrix; and correct the relationship matrix by receiving a correction of the weight in the presented relationship matrix.

In addition, in the information processing apparatus according to the aspect of the present disclosure, the trained neural network may be constructed by machine-learning a convolutional neural network, and the processor may be configured to correct the property score using one fully-connected layer to which an output of the convolutional neural network is input and the information indicating the relationship is applied.

According to another aspect of the present disclosure, there is provided an information processing method comprising: using a trained neural network to derive a property score for each of a plurality of predetermined property items regarding a structure of interest included in an image; correcting a property score for at least one property item among the plurality of property items by referring to information indicating a relationship between the plurality of property items, the information being derived by analyzing a co-occurrence relationship between descriptions of properties included in a plurality of sentences; and deriving a discrimination result for the plurality of property items regarding the structure of interest based on the corrected property score.

In addition, a program for causing a computer to execute the information processing method according to the aspect of the present disclosure may be provided.

According to the aspects of the present disclosure, it is possible to accurately discriminate a property of a structure of interest included in a medical image without using a large amount of supervised training data.

BRIEF DESCRIPTION OF THE DRAWINGS

FIG. 6 is a diagram for describing derivation of a relationship matrix.

FIG. 7 is a diagram showing a relationship matrix.

FIG. 11 is a diagram showing a correction screen of a relationship matrix.

DETAILED DESCRIPTION

Figure 1:
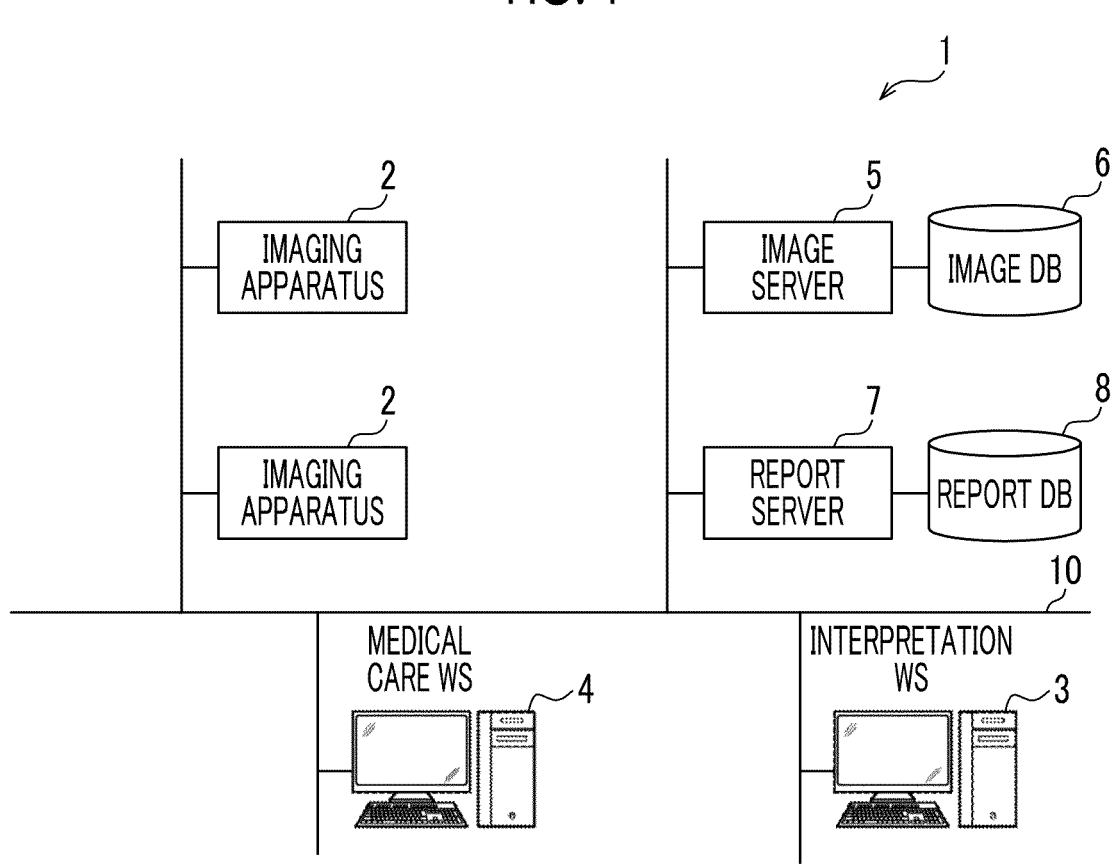
FIG. 1 is a diagram showing a schematic configuration of a medical information system to which an information processing apparatus according to an embodiment of the present disclosure is applied.

Hereinafter, embodiments of the present disclosure will be described with reference to the drawings. First, a configuration of a medical information system 1 to which an information processing apparatus according to the present embodiment is applied will be described. FIG. 1 is a diagram showing a schematic configuration of the medical information system 1. The medical information system 1 shown in FIG. 1 is, based on an examination order from a doctor in a medical department using a known ordering system, a system for imaging an examination target part of a subject, storing a medical image acquired by the imaging, interpreting the medical image by a radiologist and creating an interpretation report, and viewing the interpretation report and observing the medical image to be interpreted in detail by the doctor in the medical department that is a request source.

Each apparatus is a computer on which an application program for causing each apparatus to function as a component of the medical information system 1 is installed. The application program is stored in a storage apparatus of a server computer connected to the network 10 or in a network storage in a state in which it can be accessed from the outside, and is downloaded to and installed on the computer in response to a request. Alternatively, the application program is recorded on a recording medium, such as a digital versatile disc (DVD) and a compact disc read-only memory (CD-ROM), and distributed, and is installed on the computer from the recording medium.

The imaging apparatus 2 is an apparatus (modality) that generates a medical image showing a diagnosis target part of the subject by imaging the diagnosis target part. Specifically, it is a simple X-ray imaging apparatus, a computed tomography (CT) apparatus, a magnetic resonance imaging (MRI) apparatus, a positron emission tomography (PET) apparatus, and the like. The medical image generated by the imaging apparatus 2 is transmitted to the image server 5 and is stored in the image DB 6.

The interpretation WS 3 is a computer used by, for example, a radiologist of a radiology department to interpret a medical image and to create an interpretation report, and encompasses an information processing apparatus 20 according to the present embodiment. In the interpretation WS 3, a viewing request for a medical image to the image server 5, various image processing for the medical image received from the image server 5, display of the medical image, input reception of comments on findings regarding the medical image, and the like are performed. In the interpretation WS 3, an analysis process for medical images and input comments on findings, support for creating an interpretation report based on the analysis result, a registration request and a viewing request for the interpretation report to the report server 7, and display of the interpretation report received from the report server 7 are performed. The above processes are performed by the interpretation WS 3 executing software programs for respective processes.

The medical care WS 4 is a computer used by a doctor in a medical department to observe an image in detail, view an interpretation report, create an electronic medical record, and the like, and is configured to include a processing apparatus, a display apparatus such as a display, and an input apparatus such as a keyboard and a mouse. In the medical care WS 4, a viewing request for the image to the image server 5, display of the image received from the image server 5, a viewing request for the interpretation report to the report server 7, and display of the interpretation report received from the report server 7 are performed. The above processes are performed by the medical care WS 4 executing software programs for respective processes.

The image server 5 is a general-purpose computer on which a software program that provides a function of a database management system (DBMS) is installed. The image server 5 comprises a storage in which the image DB 6 is configured. This storage may be a hard disk apparatus connected to the image server 5 by a data bus, or may be a disk apparatus connected to a storage area network (SAN) or a network attached storage (NAS) connected to the network 10. In a case in which the image server 5 receives a request to register a medical image from the imaging apparatus 2, the image server 5 prepares the medical image in a format for a database and registers the medical image in the image DB 6.

Image data of the medical image acquired by the imaging apparatus 2 and accessory information are registered in the image DB 6. The accessory information includes, for example, an image identification (ID) for identifying each medical image, a patient ID for identifying a subject, an examination ID for identifying an examination, a unique ID (unique identification (UID)) allocated for each medical image, examination date and examination time at which a medical image is generated, the type of imaging apparatus used in an examination for acquiring a medical image, patient information such as the name, age, and gender of a patient, an examination part (an imaging part), imaging information (an imaging protocol, an imaging sequence, an imaging method, imaging conditions, the use of a contrast medium, and the like), and information such as a series number or a collection number in a case in which a plurality of medical images are acquired in one examination.

In addition, in a case in which the viewing request from the interpretation WS 3 and the medical care WS 4 is received through the network 10, the image server 5 searches for a medical image registered in the image DB 6 and transmits the searched for medical image to the interpretation WS 3 and to the medical care WS 4 that are request sources.

The report server 7 incorporates a software program for providing a function of a database management system to a general-purpose computer. In a case in which the report server 7 receives a request to register the interpretation report from the interpretation WS 3, the report server 7 prepares the interpretation report in a format for a database and registers the interpretation report in the report DB 8.

In the report DB 8, an interpretation report including at least the comments on findings created in the interpretation WS 3 is registered. The interpretation report may include, for example, information such as a medical image to be interpreted, an image ID for identifying the medical image, a radiologist ID for identifying the radiologist who performed the interpretation, a lesion name, lesion position information, information for accessing a medical image including a specific region, and property information.

Further, in a case in which the report server 7 receives a viewing request a transmission request for the interpretation report from the interpretation WS 3 and the medical care WS 4 through the network 10, the report server 7 searches for the interpretation report registered in the report DB 8, and transmits the searched for interpretation report to the interpretation WS 3 and to the medical care WS 4 that are request sources.

In the present embodiment, it is assumed that the medical image is a three-dimensional CT image consisting of a plurality of tomographic images with a lung as a diagnosis target, and an interpretation report including comments on findings on a structure of interest such as an abnormal shadow included in the lung is created by interpreting the CT image. The medical image is not limited to the CT image, and any medical image such as an MRI image and a simple two-dimensional image acquired by a simple X-ray imaging apparatus can be used.

The network 10 is a wired or wireless local area network that connects various apparatuses in a hospital to each other. In a case in which the interpretation WS 3 is installed in another hospital or clinic, the network 10 may be configured to connect local area networks of respective hospitals through the Internet or a dedicated line.

Figure 2:
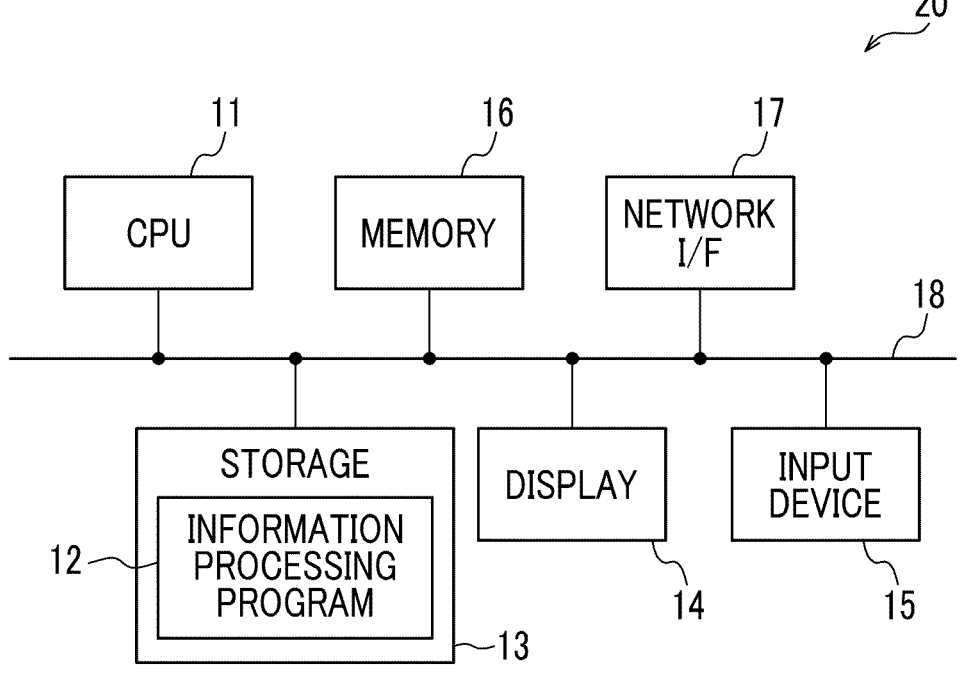
FIG. 2 is a diagram showing a schematic configuration of the information processing apparatus according to the present embodiment.

Next, the information processing apparatus according to the present embodiment will be described. FIG. 2 describes a hardware configuration of the information processing apparatus according to the present embodiment. As shown in FIG. 2, the information processing apparatus 20 includes a central processing unit (CPU) 11, a non-volatile storage 13, and a memory 16 as a temporary storage area. Further, the information processing apparatus 20 includes a display 14 such as a liquid crystal display, an input device 15 such as a keyboard and a mouse, and a network interface (I/F) 17 connected to the network 10. The CPU 11, the storage 13, the display 14, the input device 15, the memory 16, and the network I/F 17 are connected to a bus 18. The CPU 11 is an example of a processor in the present disclosure.

The storage 13 is realized by a hard disk drive (HDD), a solid-state drive (SSD), a flash memory, and the like. An information processing program is stored in the storage 13 as the storage medium. The CPU 11 reads the information processing program 12 from the storage 13, loads the read program into the memory 16, and executes the loaded information processing program 12.

Figure 3:
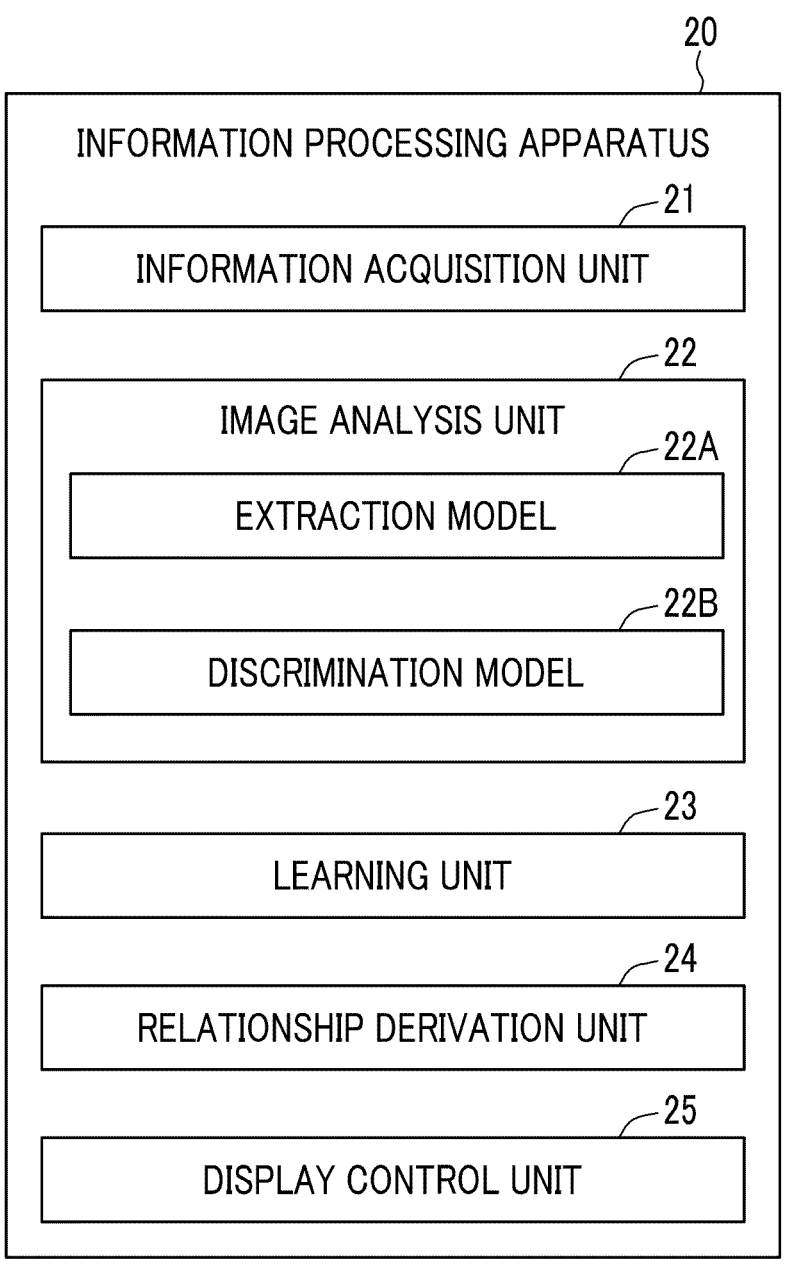
FIG. 3 is a functional configuration diagram of the information processing apparatus according to the present embodiment.

Next, a functional configuration of the information processing apparatus according to the present embodiment will be described. FIG. 3 is a diagram showing a functional configuration of the information processing apparatus according to the present embodiment. As shown in FIG. 3, the information processing apparatus 20 comprises an information acquisition unit 21, an image analysis unit 22, a learning unit 23, a relationship derivation unit 24, and a display control unit 25. Then, in a case in which the CPU 11 executes the information processing program 12, the CPU 11 functions the information acquisition unit 21, the image analysis unit 22, the learning unit 23, the relationship derivation unit 24, and the display control unit 25.

The information acquisition unit 21 acquires a medical image for creating an interpretation report from the image server 5 according to an instruction from the input device 15 by the radiologist who is an operator. The information acquisition unit 21 also acquires an interpretation report from the report server 7.

The image analysis unit 22 analyzes the medical image to derive a discrimination result for a plurality of property items regarding the structure of interest included in the medical image. To this end, the image analysis unit 22 has an extraction model 22A that extracts abnormal shadows in medical images as structures of interest, and a discrimination model 22B that derives discrimination results for each of a plurality of predetermined property items regarding the extracted structure of interest.

The extraction model 22A consists of a neural network that has been subjected to machine learning through deep learning or the like using supervised training data to extract the structure of interest from the medical image. As the extraction model 22A, for example, a well-known neural network such as a convolutional neural network (CNN) or a support vector machine (SVM) can be used. Further, the extraction model 22A may extract a structure of interest from a medical image through template matching or the like.

The discrimination model 22B also consists of a neural network that has been subjected to machine learning through deep learning or the like using supervised training data. Since the present embodiment has a feature in the discrimination model 22B, the discrimination model 22B will be described below.

Figure 4:
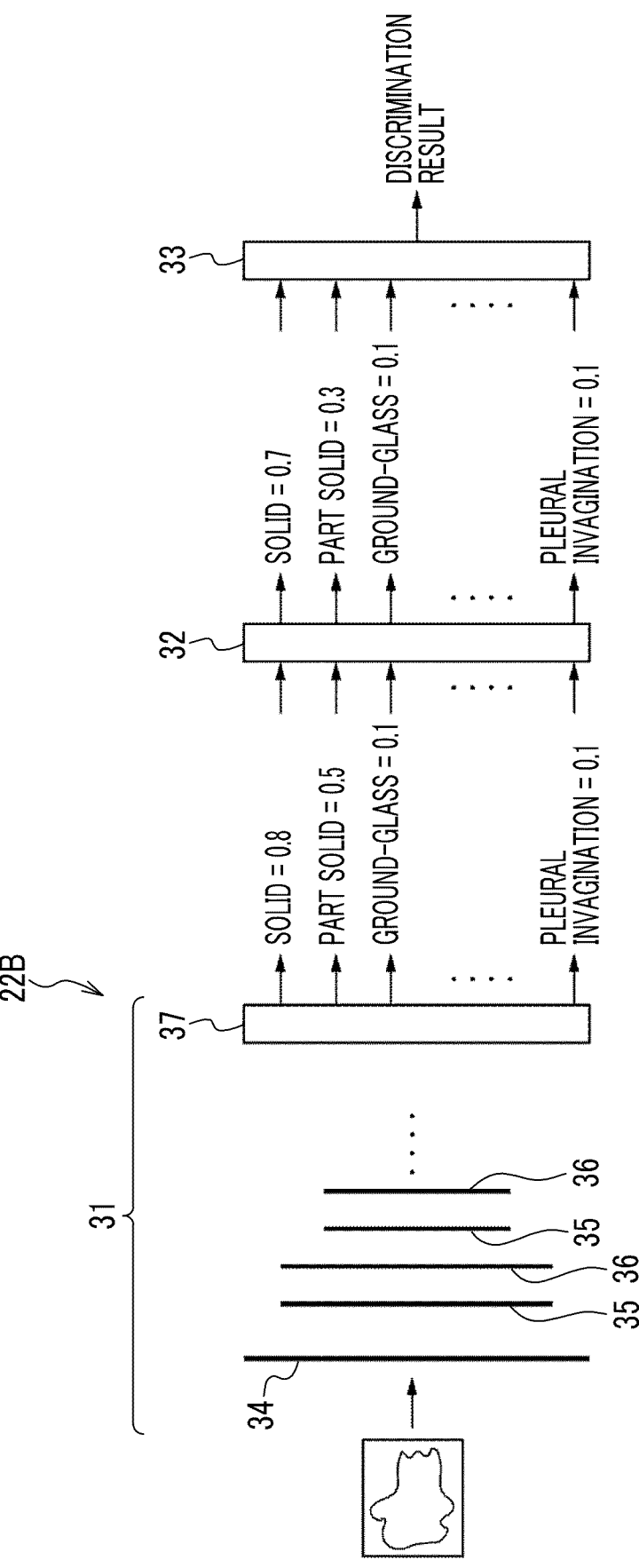
FIG. 4 is a diagram schematically showing a neural network that constitutes a discrimination model.

FIG. 4 is a diagram schematically showing a neural network that constitutes a discrimination model. As shown in FIG. 4, the discrimination model 22B has a convolutional neural network (hereinafter referred to as a CNN) 31, a fully-connected layer 32, and an output layer 33. The CNN 31 has an input layer 34, a plurality of convolutional layers 35, a plurality of pooling layers 36, and a fully-connected layer 37. The plurality of convolutional layers 35 and the plurality of pooling layers 36 are disposed alternately between the input layer 34 and the fully-connected layer 37. The configuration of the CNN 31 is not limited to the example shown FIG. 4. For example, the CNN 31 may comprise one convolutional layer 35 and one pooling layer 36 between the input layer 34 and the fully-connected layer 37.

In a case in which the medical image is input, the image analysis unit 22 extracts a structure of interest included in the medical image using the extraction model 22A. At this time, the size and position of the structure of interest are also extracted. Then, the image analysis unit 22 derives a property score for a plurality of property items regarding the structure of interest using the CNN 31 of the discrimination model 22B, corrects the property score using the fully-connected layer 32 as described later, and outputs a discrimination result for each property item using the output layer 33.

Figure 5:
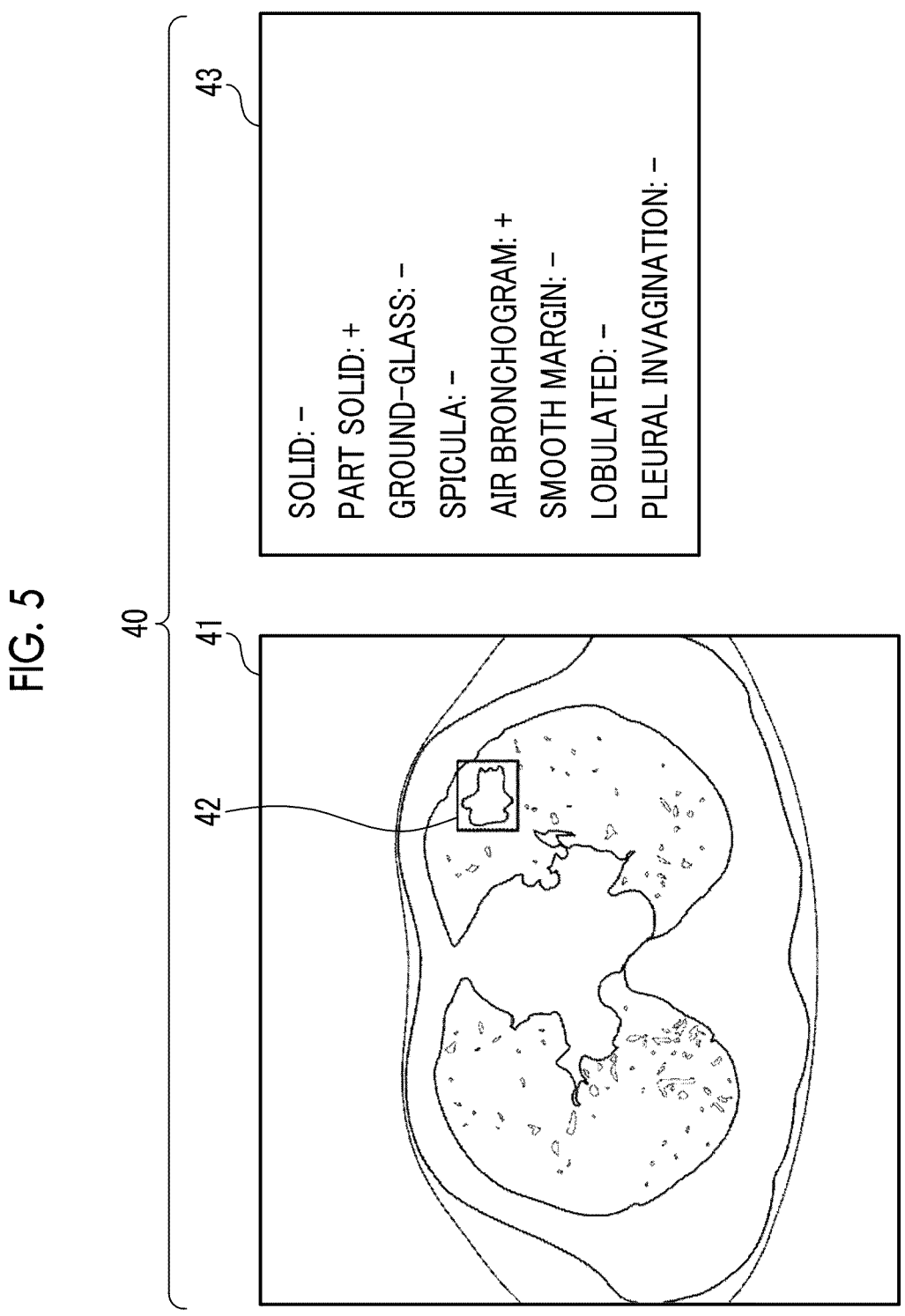
FIG. 5 is a diagram showing supervised training data.

The learning unit 23 trains the CNN 31 in the discrimination model 22B. FIG. 5 is a diagram showing an example of supervised training data for training the CNN in the discrimination model. As shown in FIG. 5, supervised training data 40 includes a structure-of-interest image 42 extracted from a medical image 41 and a discrimination result 43 for a plurality of property items derived in advance regarding the structure of interest. Although the medical image 41 is shown in FIG. 5 for the sake of description, only the structure-of-interest image 42 is used as the supervised training data 40. Therefore, in practice, the supervised training data 40 consists of a structure-of-interest image 42 and a property discrimination result 43. Note that the discrimination result 43 is correct answer data.

In the present embodiment, the abnormal shadow is a lung nodule, and the discrimination result 43 is a discrimination result for a plurality of property items regarding the lung nodule. As the property items, the type (solid, part solid, and ground-glass) of opacity, the presence or absence of spicula, the presence or absence of air bronchogram, the presence or absence of smooth margin, the presence or absence of lobulated, and the presence or absence of pleural invagination are used. Note that the examples of property items are not limited to these.

The discrimination result 43 of the properties of the structure-of-interest image 42 shown in FIG. 5 shows that for opacity, "solid" is absent, "part solid" is present, and "ground-glass" is absent, "spicula" is absent, "air bronchogram" is present, "smooth margin" is absent, "lobulated" is absent, and "pleural invagination" is absent. In addition, in FIG. 5, + is given in the case in which it is present, and – is given in the case in which it is absent. The discrimination model 22B is constructed by training the CNN 31 using a large amount of supervised training data as shown in FIG. 5.

The learning unit 23 inputs the structure-of-interest image 42 to the input layer 34 of the CNN 31. Thereby, the feature amount of the structure-of-interest image 42 is derived by the plurality of convolutional layers 35 and the pooling layers 36, and the property score for each of the plurality of property items is derived by the fully-connected layer 37. The property score is a score indicating the prominence of the property for each property item. The property score takes a value of 0 or more and 1 or less, for example, and the larger the value of the property score is, the more pronounced the property is for that property item.

The learning unit 23 then derives the difference between the property score for each of the plurality of property items output by the CNN 31 and the score for each of the property items included in the property discrimination result 43 of the supervised training data 40 as a loss. Here, the scores of each property item included in the discrimination result 43 of the supervised training data 40 are solid=0.0, part solid=1.0, ground-glass=0.0, spicula=0.0, air bronchogram=1.0, smooth margin=0.0, lobulated=0.0, and pleural invagination=0.0. The learning unit 23 derives the difference in scores between the corresponding property items as a loss. Then, the learning unit 23 adjusts parameters such as kernel coefficients in the convolutional layer 35, weights of connections between layers, and weights of connections in the fully-connected layer 37 to reduce the loss.

As a parameter adjustment method, for example, a backpropagation method can be used. The learning unit 23 repeats parameter adjustment until the loss becomes equal to or less than a predetermined threshold value. Accordingly, in a case in which an image of a structure of interest is input, the parameters are adjusted to output property scores for a plurality of property items, and the trained CNN 31 is constructed.

On the other hand, the fully-connected layer 32 of the discrimination model 22B corrects the discrimination result output by the CNN 31 using information indicating the relationship between a plurality of property items. The information indicating the relationship is a matrix that defines a weight that is larger as a co-occurrence relationship between the plurality of property items is stronger. The relationship derivation unit 24 derives the matrix.

Here, co-occurrence refers to the simultaneous appearance of a certain character string and a certain character string in any document or sentence in the field of natural language processing. For example, a word of "spicula" is often described in a comment on findings together with a word of "part solid", but is rarely described in a comment on findings together with a word of "ground-glass". Therefore, "spicula" and "part solid" more co-occur, and "spicula" and "ground-glass" rarely co-occur.

In the present embodiment, the relationship derivation unit 24 analyzes a large number of comments on findings described in the interpretation report to derive a co-occurrence relationship between words included in the comments on findings, and derives a relationship matrix that defines a weight that is larger as the co-occurrence relationship is increased. FIG. 6 is a diagram for describing the derivation of a relationship matrix. Note that the interpretation report used in a case in which the relationship matrix is derived is acquired from the report server 7 by the information acquisition unit 21.

First, the relationship derivation unit 24 derives a structured label by structuring expressions included in the comments on findings included in the interpretation report. To this end, the relationship derivation unit 24 first selects a comment on findings in which a description of a nodule in the lung is included from a large number of interpretation reports. Then, the relationship derivation unit 24 derives a named entity related to a lesion from the selected comment on findings. The named entity represents a property of the lesion included in the comment on findings. For example, "part solid", "spicula", and "air bronchogram" are derived as the named entities from a comment on findings 44 of "A 13 mm part solid nodule is found in the right lung S8. A spicula is found on the margin, and an air bronchogram is found in the internal area" shown in FIG. 6.

Furthermore, the relationship derivation unit 24 determines the factuality of the derived named entity. Specifically, the relationship derivation unit 24 determines whether the named entity represents negative, positive, or suspicious, and derives the determination result. For example, in the present embodiment, the named entities of the comment on findings 44 are "part solid", "spicula", and "air bronchogram". The comment on findings 44 describes that "a part solid nodule is found" and "a spicula is found on the margin, and an air bronchogram is found in the internal area". Therefore, the relationship derivation unit 24 determines that the factuality of each of "part solid", "spicula", and "air bronchogram" is positive. Then, the relationship derivation unit 24 derives a structured label in which the factuality is added to the named entity.

That is, as shown in FIG. 6, the relationship derivation unit 24 derives, from the comment on findings 44, a structured label 45 of "part solid +", "spicula +", and "air bronchogram +", which are given a + sign indicating that they are positive. In a case in which the description of the comment on findings is negative, such as "~ is not found", a – sign may be added, and in a case in which there is a suspicion, a ± sign may be added.

Similarly, the relationship derivation unit 24 derives a structured label 47 of "solid +", "lobulated +", and "pleural invagination +" from a comment on findings 46 of "An 8 mm solid nodule is found in the left lung S3. It is lobulated and shows pleural invagination".

Then, the relationship derivation unit 24 counts the number of positive descriptions about the same property included in the same comment on findings for the property items of "solid", "part solid", "ground-glass", "spicula", "air bronchogram", "smooth margin", "lobulated", and "pleural invagination" regarding the nodule. The counted number represents the level of the co-occurrence relationship between the property items. For this reason, the relationship derivation unit 24 determines the weights between property items according to the counted number, and derives a relationship matrix having the weights as elements.

For example, as a result of the analysis, it is assumed that there are 8,000 comments on findings in which "part solid" and "air bronchogram" are described at the same time, and there are four comments on findings in which "part solid" and "ground-glass" are described at the same time. In this case, a large weight is defined for the combination of "part solid" and "air bronchogram", and a small weight is defined for the combination of "part solid" and "ground-glass".

FIG. 7 is a diagram showing an example of a relationship matrix. Although a relationship matrix 48 shown in FIG. 7 has property items assigned to rows and columns for the sake of description, it is actually an 8×8 matrix in which only weights are elements. Note that it is preferable to perform scaling so that the weight has a value within a predetermined range. For example, it is preferable to perform scaling so that the weight is –0.2 or more and +0.2 or less.

As shown in the relationship matrix 48 in FIG. 7, for example, for the property item of part solid, the weight for the property item of air bronchogram is large at 0.20, and the weight for the property item of solid and ground-glass is small at –0.13. This indicates that, in a case in which the property of the structure of interest included in the image is part solid, the air bronchogram often appears at the same time, and the property is rarely solid and ground-glass. Note that in the relationship matrix 48, the weight between the same property items is 1.0.

The relationship matrix 48 derived by the relationship derivation unit 24 is applied to the fully-connected layer 32 of the discrimination model 22B. In a case in which the image analysis unit 22 discriminates the properties of the structure of interest included in the input medical image, the fully-connected layer 32 corrects the property score for each property item output by the trained CNN 31 using the relationship matrix 48.

Here, in the present embodiment, the CNN 31 derives property scores for the property items of "solid", "part solid", "ground-glass", "spicula", "air bronchogram", "smooth margin", "lobulated", and "pleural invagination". The property scores for the property items of "solid", "part solid", "ground-glass", "spicula", "air bronchogram", "smooth margin", "lobulated", and "pleural invagination" are set as a1 to a8. Further, the corrected property scores are set as b1 to b8. In a case in which a vector having the property scores a1 to a8 before correction as elements is denoted by Va, a vector having the property scores b1 to b8 after correction as elements is denoted by Vb, and the relationship matrix 48 is denoted by M, in the fully-connected layer 32, the calculation of Vb=M·Va is performed.

For example, the corrected property score b1 for "solid" output by the CNN 31 is derived by the calculation of b1=a1×1.0+a2×(–0.13)+a3×(–0.2)+a4×0.0+a5×0.01+a6× 0.01+a7×0.05+a8×0.03. The discrimination model 22B outputs the property score corrected by the fully-connected layer 32 as a property score for the input medical image.

Note that FIG. 4 shows a state in which the property scores of solid=0.8, part solid=0.5, ground-glass=0.1, . . . , pleural invagination=0.1 output by the CNN 31 have been corrected to solid=0.7, part solid=0.3, ground-glass= 0.1, . . . , pleural invagination=0.1 by the fully-connected layer 32.

Figure 8:
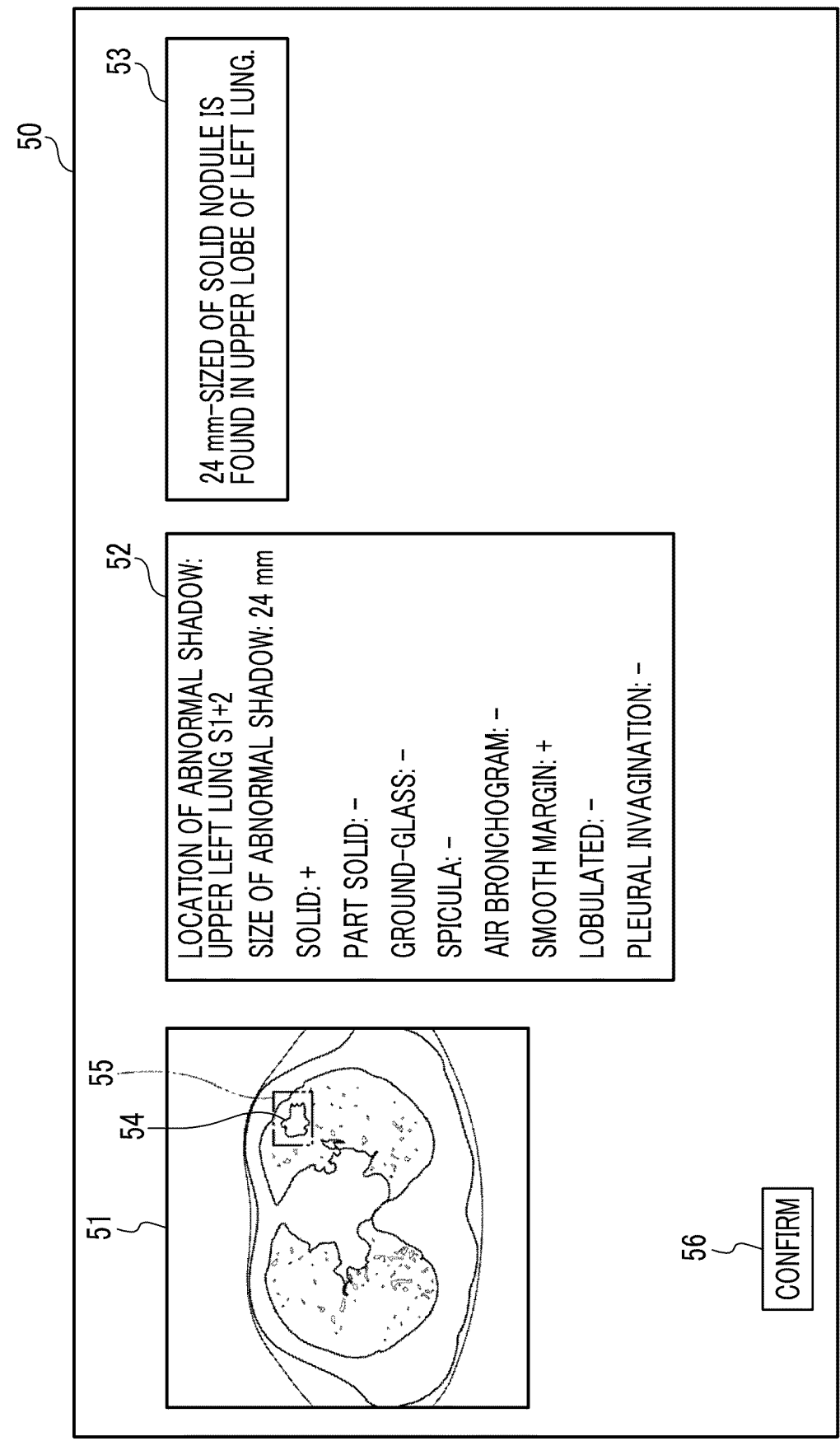
FIG. 8 is a diagram showing a creation screen of an interpretation report.

The display control unit 25 displays a creation screen of an interpretation report for the medical image. FIG. 8 is a diagram showing a creation screen of an interpretation report. As shown in FIG. 8, a creation screen 50 includes an image display region 51, a property display region 52, and a sentence display region 53. The image display region 51 displays a medical image G0 that is a target for creating an interpretation report. Further, a rectangular mark 55 is attached to a structure of interest 54 included in the medical image G0.

In the property display region 52, the discrimination results of a plurality of property items discriminated by the image analysis unit 22 for the medical image G0 are displayed. Note that, in the property display region 52 shown in FIG. 8, the discrimination results for the property items of "solid +", "part solid –", "ground-glass –", "spicula –", "air bronchogram –", "smooth margin +", "lobulated –", and "pleural invagination –" are displayed. In addition to these discrimination results, the location of the abnormal shadow and the size of the abnormal shadow ("location of the abnormal shadow: upper left lung S1+2" and "size of the abnormal shadow: 24 mm") are displayed.

In the sentence display region 53, a comment on findings input by the radiologist based on the medical image G0 and the discrimination results of the properties is displayed.

Furthermore, a confirmation button 56 is displayed below the image display region 51. The radiologist describes the comment on findings in the sentence display region 53 and then selects the confirmation button 56. Accordingly, the medical sentence displayed in the sentence display region 53 is transcribed in the interpretation report. Then, the interpretation report to which the comment on findings is transcribed is transmitted to the report server 7 together with the medical image G0 and is stored therein.

Figures 9, 10:
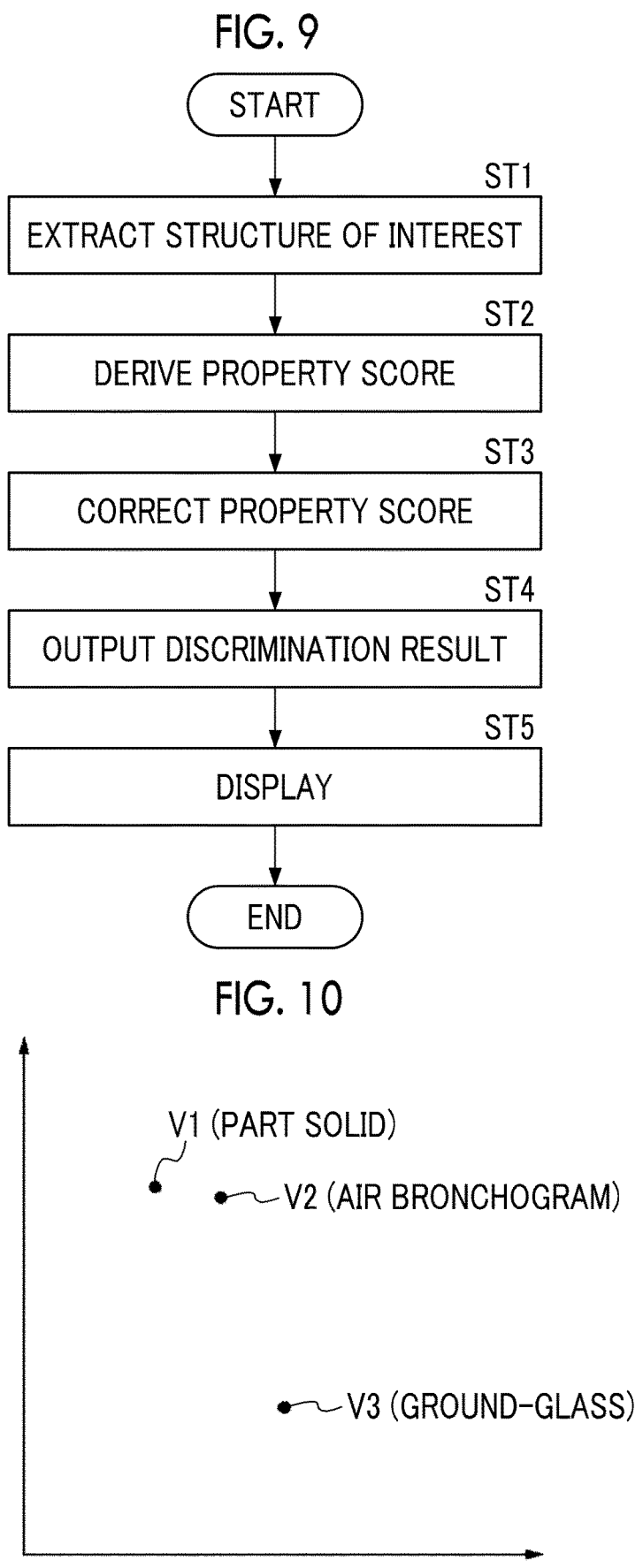
FIG. 9 is a flowchart showing processing performed in the present embodiment.
FIG. 10 is a diagram showing word vectors in a feature space.

Next, processing performed in the present embodiment will be described. FIG. 9 is a flowchart showing processing performed in the present embodiment. It is assumed that the medical image to be interpreted is acquired from the image server 5 by the information acquisition unit 21 and is stored in the storage 13. The process is started in a case in which an instruction to create an interpretation report is given by the radiologist, and the image analysis unit 22 analyzes the medical image to discriminate the properties of the structure of interest included in the medical image G0. Specifically, the extraction model 22A of the image analysis unit 22 extracts the structure of interest from the medical image G0 (Step ST1), and the CNN 31 of the discrimination model 22B derives a property score for each of the plurality of property items regarding the structure of interest (Step ST2). Then, the property score is corrected by the relationship matrix 48 applied to the fully-connected layer 32 (Step ST3), and the discrimination result for the plurality of property items is output from the output layer 33 based on the corrected property score (Step ST4).

Then, the display control unit 25 displays the creation screen of the interpretation report on the display 14 (Step ST5), and the process ends. The radiologist can create an interpretation report as described above on the creation screen of the interpretation report. The created interpretation report is transmitted to the report server 7 and is stored therein as described above.

In this way, in the present embodiment, the property score for each of the plurality of property items is corrected by referring to the relationship matrix 48, and discrimination results for the plurality of property items regarding the structure of interest are derived based on the corrected property score. By creating the relationship matrix 48 in advance in this way, it is possible to prevent the discrimination results of property items from being derived as impossible combinations without using a large amount of supervised training data. Therefore, according to the present embodiment, it is possible to accurately discriminate a property of a structure of interest included in a medical image without using a large amount of supervised training data.

In the above embodiment, the learning unit 23 may further train the discrimination model 22B using the supervised training data, and update the relationship matrix 48. In this case, in the above embodiment, the difference between the property score for each of the plurality of property items output by the CNN 31 and the score for each of the property items included in the discrimination result 43 of the supervised training data 40 is derived as a loss. However, instead of this, the difference between the corrected property score output by the fully-connected layer 32 and the score for each of the property items included in the discrimination result 43 of the supervised training data 40 may be derived as a loss.

Then, the learning unit 23 adjusts parameters such as kernel coefficients in the convolutional layer 35, weights of connections between layers, and weights of connections in the fully-connected layer 37 to reduce the derived loss. Further, the learning unit 23 updates the relationship matrix 48 by adjusting the values of each element of the relationship matrix 48.

In this way, by further training the discrimination model 22B using the supervised training data and updating the relationship matrix 48, the image analysis unit 22 can more accurately discriminate the properties of the structure of interest included in the medical image.

Note that in the above embodiment, a large number of interpretation reports are analyzed, and the relationship matrix 48 is derived based on the co-occurrence relationship between a plurality of property items, but the present disclosure is not limited thereto. For example, words included in a large number of interpretation reports may be vectorized using a word2ve method, and the weight of the relationship matrix may be defined based on the distance in the feature space between the vectorized words. The word2vec method is described in detail in "Efficient Estimation of Word Representations in Vector Space, Tomas Mikolov et al., 1301.3781v3, 7 Sep. 2013".

FIG. 10 schematically shows a state in which words included in a large number of interpretation reports are vectorized using the word2vec method and the words are plotted in the feature space. Although the dimension of the vectorized word (hereinafter referred to as a word vector) is multidimensional, in FIG. 10, the word vectors are shown in two-dimensional. In addition, FIG. 10 shows a state in which word vectors V1, V2, and V3 for the three words of "part solid", "air bronchogram", and "ground-glass" are plotted in the feature space. As shown in FIG. 10, in the feature space, the distance between the word vector V1 of "part solid" and the word vector V2 of "air bronchogram" is short, but the distance between the word vector V1 of "part solid" and the word vector V3 of "ground-glass" is long.

Therefore, the relationship derivation unit 24 derives a word vector for the words included in the interpretation report, and derives a distance d between the word vectors in the feature space of the word vector. As the distance d, any distance can be used, such as the Euclidean distance and the Mahalanobis distance. Moreover, a threshold value satisfying $\alpha < \beta$ is set, and the weight may be set to +0.20 in a case in which the distance $d < \alpha$ is satisfied, the weight may be set to $-0.20$ in a case in which the distance $d > \beta$ is satisfied, and the weight may be derived by calculating $0.4 \times (d-\alpha)/(\beta-\alpha) - 0.2$ in a case in which $\alpha < d < \beta$ is satisfied.

Note that instead of the weight according to the distance d described above, the cosine similarity (inner product) between word vectors may be used as the weight. In this case, since the cosine similarity has a value of $-1.0$ to $+1.0$, the derived cosine similarity value may be directly defined in the relationship matrix. Alternatively, the weight may be defined by scaling the cosine similarity to a value between $-0.20$ and $+0.20$.

Further, in the above embodiment, the relationship derivation unit 24 derives the relationship matrix by analyzing the interpretation report, but an expert with knowledge may derive the relationship matrix with defined weights.

Further, in the above embodiment, the relationship matrix 48 may be corrected. In this case, the display control unit 25 displays a correction screen of the relationship matrix 48 on the display 14 in response to an instruction from the input device 15, and receives an instruction to correct the relationship matrix from a user such as a radiologist on the correction screen. Then, the relationship derivation unit 24 corrects the relationship matrix in response to the correction instruction.

FIG. 11 is a diagram showing a correction screen of a relationship matrix. As shown in FIG. 11, a relationship matrix 61 is displayed on the correction screen 60. Note that in the relationship matrix 61 shown in FIG. 11, unlike the relationship matrix 48 shown in FIG. 7, the values of each element are discretized in five stages. Specifically, the relationships are discretized into five stages of ++, +, +/−, −, and − in descending order of the relationship. Note that ++, +, +/−, −, and −− may be set to, for example, 0.20, 0.05, 0.0, −0.05, and −0.20, respectively, as weight values.

As shown in FIG. 11, for example, for the property item of part solid, the weight for the property item of air bronchogram is large at ++, and the weight for the property item of solid and ground-glass is small at −. The user can correct each element of the relationship matrix 61 on the correction screen 60 to have the relationship desired by the user. For example, by selecting a desired element in the relationship matrix 61 using the input device 15, a pull-down menu from which one of the ++, +, +/−, −, and −− can be selected is displayed, and the relationship can be corrected by selecting the desired relationship from the displayed pull-down menu.

By making the elements of the relationship matrix 61 correctable in this way, the properties of the structure of interest can be discriminated with higher accuracy.

Note that the correction of the relationship matrix 61 is not limited to the selection of the discretized relationship as described above in the pull-down menu. The user may be able to select a desired element in the relationship matrix 61 and input a desired weight to the selected element as a numerical value.

In the above embodiment, the image analysis unit 22 separately includes the extraction model 22A that extracts a structure of interest from a medical image and the discrimination model 22B that discriminates the properties of the structure of interest. However, the present disclosure is not limited thereto. An extraction model that extracts a structure of interest from a medical image and discriminates the properties of the structure of interest may be used.

Further, in above-described embodiment, for example, as hardware structures of processing units that execute various kinds of processing, such as the information acquisition unit 21, the image analysis unit 22, the learning unit 23, the relationship derivation unit 24, and the display control unit 25, various processors shown below can be used. As described above, the various processors include a programmable logic device (PLD) as a processor of which the circuit configuration can be changed after manufacture, such as a field-programmable gate array (FPGA), a dedicated electrical circuit as a processor having a dedicated circuit configuration for executing specific processing such as an application-specific integrated circuit (ASIC), and the like, in addition to the CPU as a general-purpose processor that functions as various processing units by executing software (program).

One processing unit may be configured by one of the various processors, or may be configured by a combination of the same or different types of two or more processors (for example, a combination of a plurality of FPGAs or a combination of the CPU and the FPGA). In addition, a plurality of processing units may be configured by one processor. As an example where a plurality of processing units are configured by one processor, first, there is a form in which one processor is configured by a combination of one or more CPUs and software as typified by a computer, such as a client or a server, and this processor functions as a plurality of processing units. Second, as represented by a system-on-chip (SoC) or the like, there is a form of using a processor for realizing the function of the entire system including a plurality of processing units with one integrated circuit (IC) chip. In this way, various processing units are configured by one or more of the above-described various processors as hardware structures.

Furthermore, as the hardware structure of the various processors, more specifically, an electrical circuit (circuitry) in which circuit elements such as semiconductor elements are combined can be used.

What is claimed is:

1. An information processing apparatus comprising at least one processor,
  wherein the processor is configured to:
    use a trained neural network to derive a property score for each of a plurality of predetermined property items regarding a structure of interest included in an image;
    correct a property score for at least one property item among the plurality of property items by referring to information indicating a relationship between the plurality of property items, the information being derived by analyzing a co-occurrence relationship between descriptions of properties included in a plurality of sentences; and
    derive a discrimination result for the plurality of property items regarding the structure of interest based on the corrected property score.

2. The information processing apparatus according to claim 1,
  wherein the processor is configured to:
    further train the neural network using supervised training data in which a structure of interest included in a medical image and the plurality of property items regarding the structure of interest are specified; and
    update the information indicating the relationship based on a result of the training.

3. The information processing apparatus according to claim 1,
  wherein the information indicating the relationship is a relationship matrix in which a weight, which is larger as a co-occurrence relationship between the plurality of property items is stronger, is defined as an element.

4. The information processing apparatus according to claim 2,
  wherein the information indicating the relationship is a relationship matrix in which a weight, which is larger as a co-occurrence relationship between the plurality of property items is stronger, is defined as an element.

5. The information processing apparatus according to claim 3,
  wherein the weight is scaled within a predetermined range.

6. The information processing apparatus according to claim 4,
  wherein the weight is scaled within a predetermined range.

7. The information processing apparatus according to claim 3,
  wherein the processor is configured to:
    present the relationship matrix; and
    correct the relationship matrix by receiving a correction of the weight in the presented relationship matrix.

8. The information processing apparatus according to claim 4,
  wherein the processor is configured to:
    present the relationship matrix; and
    correct the relationship matrix by receiving a correction of the weight in the presented relationship matrix.

9. The information processing apparatus according to claim 5,
  wherein the processor is configured to:
    present the relationship matrix; and
    correct the relationship matrix by receiving a correction of the weight in the presented relationship matrix.

10. The information processing apparatus according to claim 6,
  wherein the processor is configured to:
    present the relationship matrix; and
    correct the relationship matrix by receiving a correction of the weight in the presented relationship matrix.

11. The information processing apparatus according to claim 1,
  wherein the trained neural network is constructed by machine-learning a convolutional neural network, and
  the processor is configured to correct the property score using one fully-connected layer to which an output of the convolutional neural network is input and the information indicating the relationship is applied.

12. An information processing method comprising:
  using a trained neural network to derive a property score for each of a plurality of predetermined property items regarding a structure of interest included in an image;
  correcting a property score for at least one property item among the plurality of property items by referring to information indicating a relationship between the plurality of property items, the information being derived by analyzing a co-occurrence relationship between descriptions of properties included in a plurality of sentences; and deriving a discrimination result for the plurality of property items regarding the structure of interest based on the corrected property score.

13. A non-transitory computer-readable storage medium that stores an information processing program for causing a computer execute:

a procedure of using a trained neural network to derive a property score for each of a plurality of predetermined property items regarding a structure of interest included in an image;

a procedure of correcting a property score for at least one property item among the plurality of property items by referring to information indicating a relationship between the plurality of property items, the information being derived by analyzing a co-occurrence relationship between descriptions of properties included in a plurality of sentences; and a procedure of deriving a discrimination result for the plurality of property items regarding the structure of interest based on the corrected property score.

* * * * *